(No Model.)
C. C. PIERCE.
HOOK.
No. 377,772.   Patented Feb. 14, 1888.
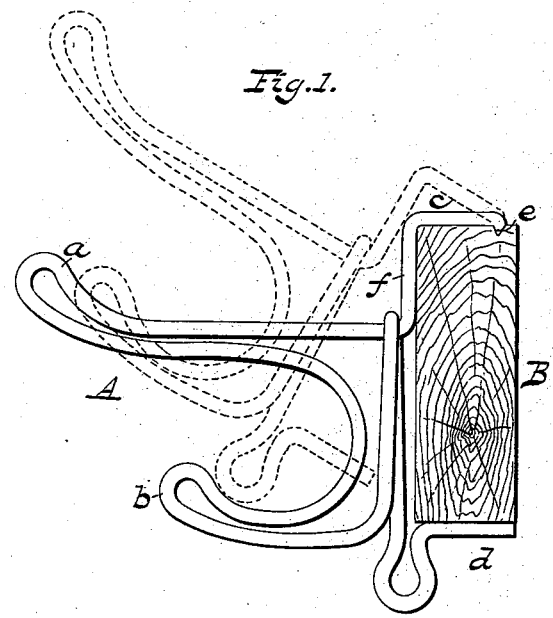
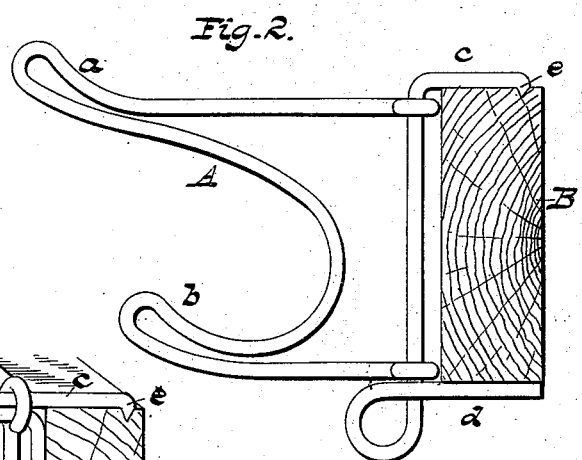
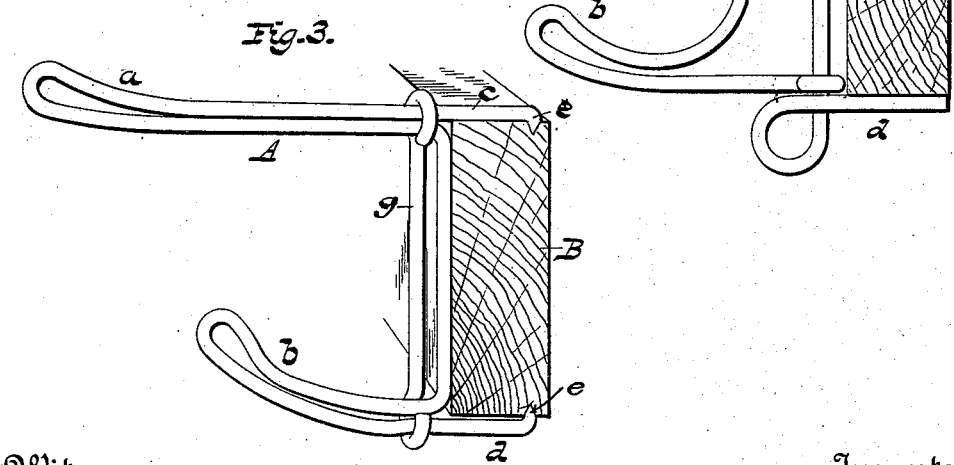
Witnesses
James P. DuHamel
Walter S. Dodge
Inventor
Christopher C. Pierce,
By his Attorneys,
Dodger & Son

UNITED STATES PATENT OFFICE.

CHRISTOPHER C. PIERCE, OF HERKIMER, NEW YORK.

HOOK.

SPECIFICATION forming part of Letters Patent No. 377,772, dated February 14, 1888.

Application filed April 15, 1887. Serial No. 234,937. (No model.)

*To all whom it may concern:*

Be it known that I, CHRISTOPHER C. PIERCE, of Herkimer, in the county of Herkimer and State of New York, have invented certain new and useful Improvements in Hooks, of which the following is a specification.

My invention relates to coat-hooks, and has for its object to render such hooks simple and cheap in construction and at the same time permit them to be readily attached to and detached from their supporting-bar.

To this end the invention consists in making the hook of wire, (preferably steel,) and providing the same with two rearwardly-extending arms adapted to clasp the upper and lower faces of the supporting-bar, one or both of said arms being elastic or having a slight spring action.

The invention further consists in a hook constructed as above set forth and having one or both of its arms provided with a spur or tooth to engage the supporting-bar.

The invention further consists in the combination, with a hook constructed as first above set forth, of a clamping device arranged so as to cause the arms to firmly clasp the support.

The invention also consists in constructing the hook in such manner as to permit it to be swung laterally to economize in space.

Referring to the drawings, Figure 1 is a perspective view of a coat-hook embodying my invention in its preferred form, and Figs. 2 and 3 views illustrating various modifications of the same.

A indicates the hook as a whole, and B the supporting-bar therefor. Upon reference to Fig. 1 it will be seen that the hook consists, preferably, of a single piece of wire bent so as to form suspending-hooks $a$ and $b$ of the same general form as in hooks now in use, the ends of the wire forming the hook proper being extended backward to form arms $c$ and $d$.

One of the arms may be provided at its end with a tooth or spur, $e$, as shown in Figs. 1, 2, and 3, the said tooth being adapted to engage and embed itself into the upper face of the supporting-bar. When it is desired to secure the hook to its supporting-bar, the arm $c$ of the hook is placed upon the upper face of the supporting-bar B, as shown in dotted lines in Fig. 1, the tooth or spur $e$ being embedded into the upper face of the bar B. By pulling down upon the hook $a$ the arm $d$ will be forced beneath and in contact with the under face of bar B, and, owing to the elasticity of the arm $d$, the hook will be retained in place.

If desired, the lower edge of bar B may be slightly inclined or beveled to facilitate the passage of the arm $d$ beneath the bar.

While in practice it will be found sufficient to make only the arm $d$ elastic or capable of springing, the arm $c$ may, if desired, be also slightly elastic. In fact, the arm $c$ will yield to a greater or less extent in any event.

From this construction it will be seen that the weight of the articles placed upon hooks $a\ b$ operates to increase the hold or bite of the hook proper, A, upon its supporting-bar.

The tooth or spur $e$ may be omitted, if desired, the hook being retained in proper position by the elasticity of the arm $d$, or of the arms $c$ and $d$ in case they should both be made elastic.

It will be noticed that the upright portion $f$ of the hook bears squarely against the front face of bar B, and thereby aids materially in holding the hook in proper position.

In Fig. 2 I have shown the hook as made of two pieces of wire jointed to each other in such manner as to enable the hook to be swung laterally to either side when employed in wardrobes or in folding racks; but here, as in the former construction, the hook is secured in position by means of the arms $c\ d$, one or both of which being provided with a spur or tooth, $e$.

In Fig. 3 both arms $c$ and $d$ are shown provided with a spur, $e$, and the hook is also provided with a wire clamping-link, $g$, encircling at its ends the arms $c$ and $d$. As the lower end of the link is moved inward toward the supporting-bar, it brings the arm $d$ upward against the under side of bar B and firmly embeds the tooth or spur $e$ on each arm $c$ and $d$ into the bar B.

The link $g$ may obviously be used even when the teeth or spurs $e$ are omitted.

From the foregoing description it will be seen that I possess a hook that is cheap and simple to make, and one that can be readily applied to its supporting-bar at different points throughout the length of the latter.

The hook may be made more or less ornamental in appearance by bending or twisting, and it is likewise obvious that the form of the arms *c d* may be varied somewhat without departing from the spirit of my invention.

I am aware that a meat-hook has been patented in which the supporting-arms are provided with a spur, and to such construction I lay no broad claim; nor do I wish to be understood as claiming, broadly, a coat-hook made of wire, as I am aware that various forms of such hooks have before been patented. I am not aware, however, that any one prior to my invention ever constructed a coat-hook with two rearwardly-extending clamping-arms, one or both being elastic, so that the hook might be readily secured to or detached from its supporting-bar.

I am aware of Letters Patent No. 359,953, granted March 22, 1887, to William H. Atwood, and I make no claim to anything covered by said patent.

Having thus described my invention, what I claim is—

1. The coat-hook herein described, provided with the two rearwardly-extending supporting-arms, one or both of said arms being elastic, substantially as and for the purpose set forth.

2. As an improved article of manufacture, the bent-wire coat-hook herein described, provided with two rearwardly-extending clamping-arms for attachment of the hook to its supporting-bar.

3. As an improved article of manufacture, the bent-wire coat-hook herein described, provided with two rearwardly-extending clamping-arms, one or both being elastic, for the attachment of the hook to its supporting-bar.

4. The coat-hook herein described, provided with the rearwardly-extending supporting-arms, one or both being elastic, and one of which is provided with a tooth or spur, *e*, as and for the purpose set forth.

5. The coat-hook herein described, provided with the rearwardly-extending supporting-arms *c d*, one or both being elastic, and a device, substantially such as shown and described, connecting the two arms and serving to draw them together.

6. In combination with a bar or support, B, the swinging coat-hook provided with two rearwardly-extending clamping-arms, *c* and *d*.

7. A coat-hook made of a single piece of wire bent to proper form and comprising supporting-hooks *a b*, rearwardly-extending arms *c d*, a tooth or spur, *e*, and an upright portion, *f*.

In witness whereof I hereunto set my hand in the presence of two witnesses.

CHRISTOPHER C. PIERCE.

Witnesses:
 FRANK TRENBETH,
 W. I. TABER.